(12) United States Patent
Aher et al.

(10) Patent No.: US 11,979,625 B2
(45) Date of Patent: *May 7, 2024

(54) DYNAMIC SCHEDULING OF CONTENT

(71) Applicant: Rovi Guides, Inc., San Jose, CA (US)

(72) Inventors: Ankur Anil Aher, Maharashtra (IN); Charishma Chundi, Andhra Pradesh (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,980

(22) Filed: Nov. 16, 2022

(65) Prior Publication Data

US 2023/0283824 A1 Sep. 7, 2023

Related U.S. Application Data

(63) Continuation of application No. 17/217,034, filed on Mar. 30, 2021, now Pat. No. 11,533,528.

(51) Int. Cl.
*H04N 21/262* (2011.01)
*H04N 21/258* (2011.01)
*H04N 21/466* (2011.01)

(52) U.S. Cl.
CPC . *H04N 21/26241* (2013.01); *H04N 21/25891* (2013.01); *H04N 21/26258* (2013.01); *H04N 21/4668* (2013.01)

(58) Field of Classification Search
CPC ....... H04N 21/26241; H04N 21/25891; H04N 21/26258; H04N 21/4668
See application file for complete search history.

(56) References Cited

U.S. PATENT DOCUMENTS

| | | | |
|---|---|---|---|
| 10,097,879 B1* | 10/2018 | Bates | H04N 21/2181 |
| 10,779,042 B1 | 9/2020 | Gupta et al. | |
| 2007/0157237 A1 | 7/2007 | Cordray et al. | |
| 2011/0078174 A1 | 3/2011 | Lee et al. | |
| 2013/0204825 A1 | 8/2013 | Su | |
| 2014/0059608 A1 | 2/2014 | Beattie et al. | |
| 2014/0157295 A1 | 6/2014 | Jagtiani et al. | |
| 2014/0215504 A1 | 7/2014 | Hsiao et al. | |
| 2014/0337751 A1 | 11/2014 | Lim et al. | |
| 2015/0058873 A1 | 2/2015 | Newell et al. | |
| 2016/0142783 A1* | 5/2016 | Bagga | H04N 21/4532 725/47 |
| 2016/0354285 A1 | 12/2016 | Nolan et al. | |
| 2017/0257337 A1* | 9/2017 | Hampson | H04L 51/224 |
| 2022/0321935 A1 | 10/2022 | Aher et al. | |

* cited by examiner

*Primary Examiner* — Nnenna N Ekpo
(74) *Attorney, Agent, or Firm* — Haley Guiliano LLP

(57) ABSTRACT

Systems and methods are provided for recommending and dynamically scheduling content. A time when a request to consume a content item is likely to be received is identified and an identifier of the content item is displayed on a device. Prior to the identified time, an option to consume, at the identified time, the content item is also displayed on the device. In response to the option being selected, the device stops displaying the identifier of the content item until the identified time.

20 Claims, 10 Drawing Sheets

| February | 2<br>Thursday | 3<br>Friday | 4<br>Saturday | 5<br>Sunday |
|---|---|---|---|---|
| 9AM | | | | Sam Visiting<br>206 |
| 12PM | | | | |
| 3PM | | Flight to Miami<br>204 | | |
| 6PM | | | | |
| 9PM | | | | |

DYNAMIC SCHEDULING OF CONTENT

CROSS REFERENCE TO RELATED APPLICATION

This application is a continuation of U.S. patent application Ser. No. 17/217,034, filed Mar. 30, 2021, which is hereby incorporated by reference herein in its entirety.

BACKGROUND

The present disclosure is directed to systems and methods for recommending and dynamically scheduling content, and more particularly, for recommending and dynamically scheduling content based on scheduling options.

SUMMARY

When looking for content to watch, users may refer to recommendations provided by a content platform. Oftentimes, when a user is browsing through content recommendations, the user may come across a content item they wish to view in the future (e.g., on the weekend). However, when that time comes, the user may forget what the content item is and may spend a significant amount of time trying to find the content item. In some cases, if the content item was previously provided as a content recommendation and the content recommendations were updated, it may be difficult for the user to find the content item. Alternatively, if content recommendations for the user are not updated frequently, the user may see the same recommendations over and over until they finally watch the content item or remove the content item from the content recommendations.

Accordingly, to solve these problems, systems and methods are provided for dynamically scheduling content. For example, a media guidance application may recommend and dynamically schedule a content item based on scheduling options. The media guidance application identifies a time when a request to consume a content item is likely to be received and causes a device to generate for display an identifier of the content item (e.g., as a recommendation to the user). Prior to the identified time, the media guidance application causes the device to generate for display an option to consume, at the identified time, the content item, and, in response to the option being selected, causes the device to stop displaying the identifier of the content item until the identified time. For example, the media guidance application prevents the content item from being recommended to the user again until the identified time.

In some embodiments, the media guidance application may, at the identified time, in response to the option being selected, cause the device to resume displaying the identifier of the content item.

In some embodiments, the media guidance application may, at the identified time, in response to the option being selected, transmit, to a second device, a reminder to consume the content item.

In some embodiments, the option is overlaid on the identifier of the content item.

In some embodiments, the media guidance application may, when identifying the time when the request to consume the content item is likely to be received, include accessing a calendar of a user, and analyze the calendar of the user to determine the time when the user is likely to request to consume the content item.

In some embodiments, the media guidance application may, prior to the identified time and in response to the option being selected, cause the device to display an identifier of a second content item by replacing the identifier of the first content item with the identifier of the second content item.

In some embodiments, the media guidance application may, prior to the identified time and in response to the option being selected, cause the device to download the content item.

In some embodiments, the media guidance application may, when identifying the time when the request to consume the content item is likely to be received, identify a time specified by a user.

In some embodiments, the media guidance application may cause the device to generate for display identifiers of a set of content items recommended to a user, wherein the set of content items recommended to the user includes the content item.

In some embodiments, the media guidance application may, after the identified time and in response to determining that the content item was not consumed at the identified time, cause the device to generate for display a second option to consume, at a modified time, the content item. In response to the second option being selected, the media guidance application may cause the device to stop displaying the identifier of the content item until the modified time.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
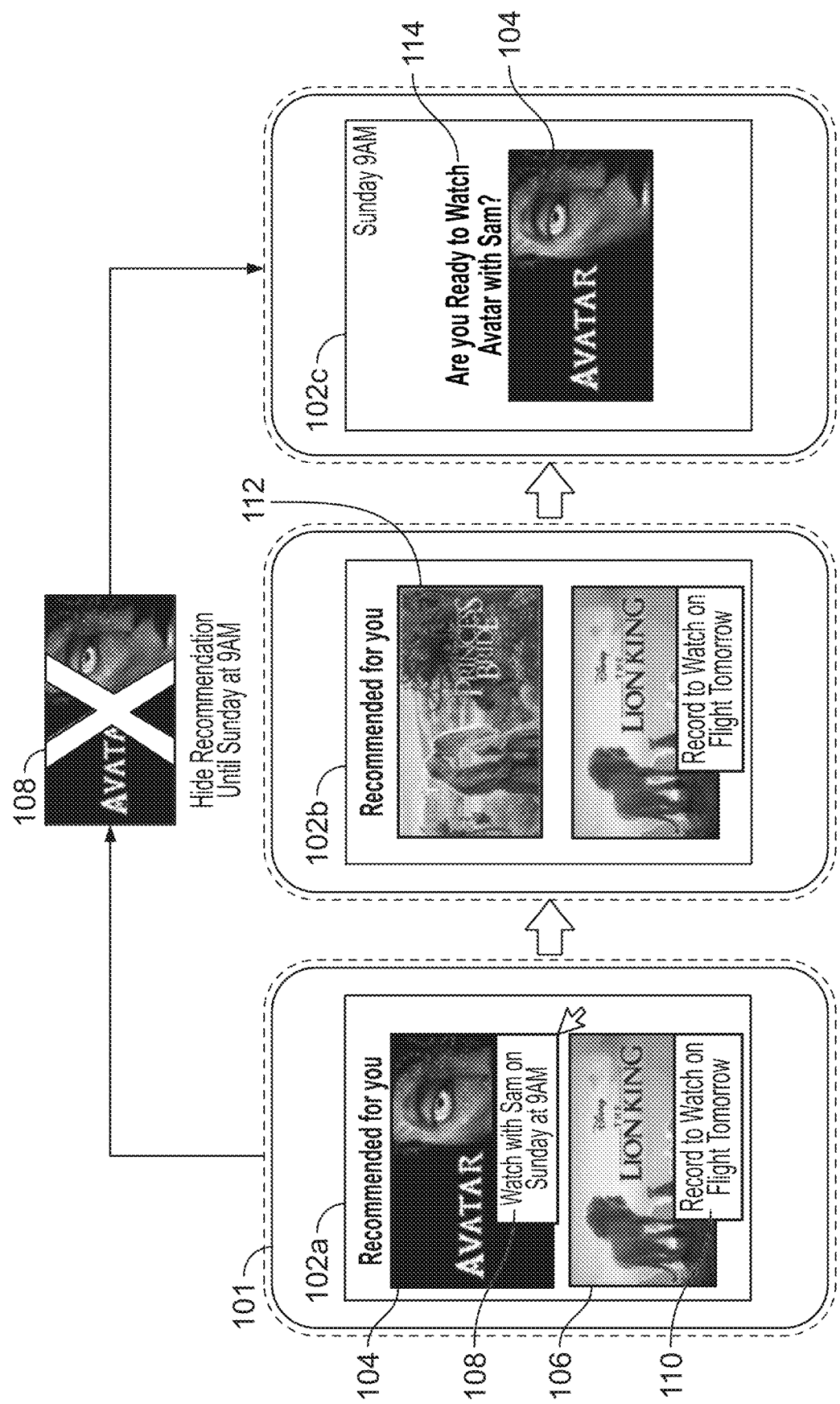
FIG. 1 shows an illustrative process for recommending and dynamically scheduling content, in accordance with some embodiments of the present disclosure.

FIG. 1 shows an illustrative process 100 for recommending and dynamically scheduling content, in accordance with some embodiments of the present disclosure. User equipment 101 is depicted as a tablet, but may be any user equipment with any functionality described below with respect to at least FIGS. 4 and 5. The user equipment 101 comprises control circuitry (also described further below with respect to FIGS. 4 and 5), which executes a media guidance application.

The media guidance application may generate for display, on either a display of the user equipment 101 or on a display of a different device, a display screen 102a. As shown, the display screen 102a may include content identifiers 104 and 106 for content items (e.g., "Avatar" and "The Lion King") that may be of interest to a user, among the content items available on a content platform. For example, the media guidance application may compare characteristics or attributes (e.g., genre, actors) of content items previously watched by the user with characteristics or attributes of other content items to identify content items with matching or similar characteristics or attributes. Scheduling options 108 and 110 for scheduling a time to consume one or more of the content items may also be displayed on the display screen 102a. For example, as shown, a first scheduling option 108 to "Watch [Avatar] with Sam on Sunday at 9 AM" may be overlaid on a first content identifier 104 for "Avatar," while a second scheduling option 110 to "Record [The Lion King] to watch on flight tomorrow" may be overlaid on the second content identifier 106 for "The Lion King." Although an equal number of scheduling options and content identifiers are shown, this is only an example, and certain content identifiers may be associated with multiple scheduling options or may not be associated with any scheduling options. In some embodiments, if a content identifier is not displayed with a scheduling option, a user may create a scheduling option, as described in further detail below. In some cases, the time associated with scheduling options may be based on the schedule of a user, as described in further detail below with respect to FIG. 2.

Figures 2, 3:
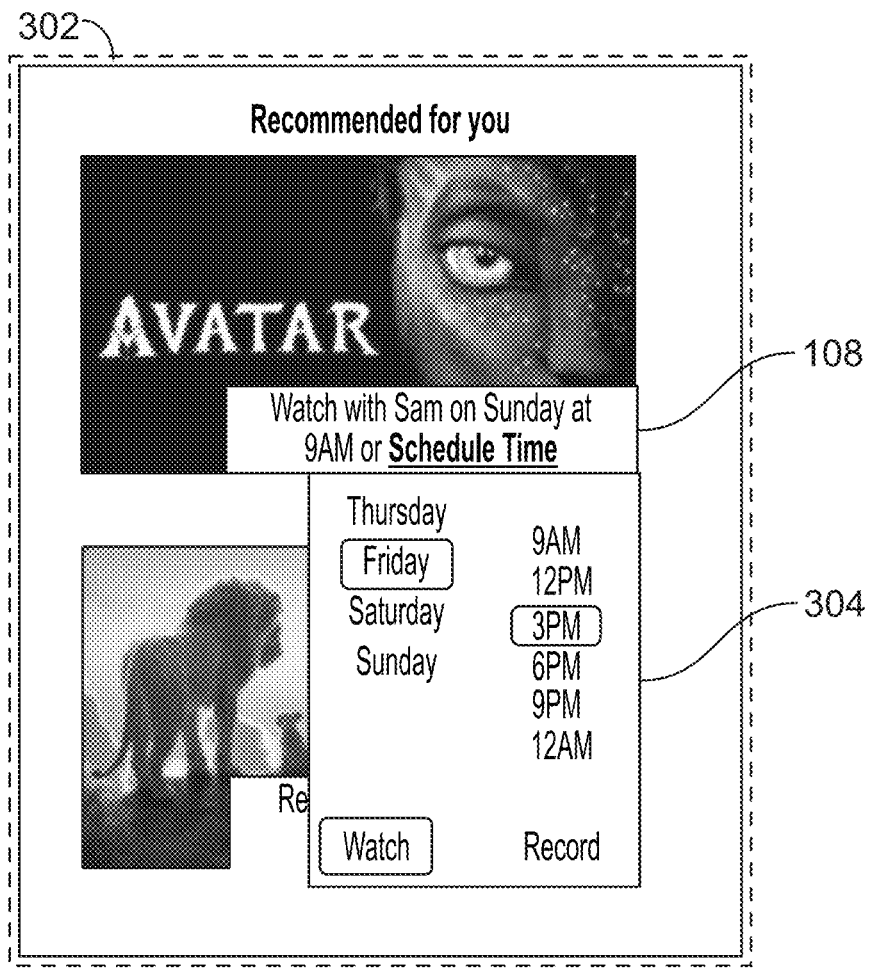
FIG. 2 shows an example of calendar data 202 of a user, in accordance with some embodiments of the present disclosure.
FIG. 3 shows an example of a display screen that allows a user to specify a time for a scheduling option, in accordance with some embodiments of the present disclosure.

FIG. 2 shows an example of calendar data 202 of a user, in accordance with some embodiments of the present disclosure. Before displaying personalized content recommendations or scheduling options for consuming displayed content recommendations, the media guidance application may identify the user viewing the user equipment 101. For example, if the content platform the user is accessing requires the user to log in, the media guidance application may determine the identity of the user as the user associated with the account. The media guidance application may also identify the user using information obtained from a device associated with the user (e.g., the user equipment 101, a smartwatch, a smartphone, etc.), using cameras or facial recognition techniques, or other identification techniques. Based on the identity of the user, the media guidance application may retrieve a calendar of the user (e.g., calendar data 202). In some embodiments, the calendar data 202 of the user may be stored in a user profile. In some embodiments, if the media guidance application identifies multiple users, the media guidance application may retrieve calendar data 202 for each of the identified users.

The media guidance application may analyze the calendar data 202 to determine times when the user is likely to request to consume content items. For example, as shown, the media guidance application may identify a first time 204 (e.g., a flight to Miami from 3 PM to 9 PM on Friday, February $3^{rd}$) and a second time 206 (e.g., when the user's friend Sam is visiting from 9 AM to 3 PM on Sunday, February $5^{th}$). In some embodiments, the media guidance application may analyze historical data (e.g., the user's viewing history during similar events) to determine if the user is likely to consume content during a scheduled event. In some embodiments, the events in the calendar data 202 may be scheduled by the user. In some embodiments, the media guidance application may track times when the user is likely to consume content (e.g., every Friday night). In some embodiments, the media guidance application may analyze only the calendar data 202 in the near future (e.g., the upcoming week or some other predetermined time frame or user-defined time frame).

Returning to FIG. 1, based on the identified times 204 and 206 when the user is likely to consume content, the media guidance application may generate scheduling options to be associated with content recommendations. In some embodiments, the content recommendations may be based on the identified user activity during the identified times 204 and 206. For example, with respect to the first identified time 204, if the media guidance application determines that the user will be in a public place when consuming content (e.g., on their flight to Miami), the media guidance application may promote content (e.g., "The Lion King") that has a low rating (e.g., PG-13 or below). The media guidance application may also determine an action to associate with the scheduling option. For example, if the media guidance application determines that the user will be on a plane, the media guidance application may suggest recording the content before the user boards their flight. With respect to the second identified time 206, the media guidance application may analyze the user's profile and conversations with their friend "Sam" and determine that the user and Sam have been talking about "Avatar." Based on this determination, the media guidance application may promote "Avatar" as a content recommendation and associate this recommendation with Sam's visit. In some embodiments, the media guidance application may rank the identified times (e.g., based on how likely the user is to consume content during the time and/or how confident the media guidance application is that the user will like the recommended content) and display the recommended content based on this ranking. For example, although the second identified time 206 is later in the week than the first identified time 204, the media guidance application may display "Avatar" as the highest recommendation (e.g., displayed first on the display screen 102a). However, this is only an example, and the order of scheduling options 108 and 110 may be based on how far the identified times are in the future.

If the user selects a scheduling option (e.g., 108 or 110), the media guidance application may schedule the action associated with the selected scheduling option (e.g., play the content, send a reminder for the content, and/or record the content). For example, if the user selects the first scheduling option 108, the media guidance application may schedule a reminder to be generated for display at the associated identified time ("9 AM on Sunday, February $5^{th}$"). In some embodiments, the media guidance application may add the scheduled content item to a list (e.g., a hot list), which is accessible to the user (e.g., to view the scheduled content item). Additionally, as shown, after scheduling the reminder, the media guidance application may stop the associated content identifier (e.g., for "Avatar") from being displayed (e.g., as recommended content) until the identified time. For example, the media guidance application may update the display screen 102a to display screen 102b.

As shown, in the display screen 102b, the first content identifier 104 has been replaced by a new content identifier 112 for a new content item (e.g., "The Princess Bride"). Although the new content identifier 112 is shown without a scheduling option, this is only an example, and the new content identifier 112 may be associated with a scheduling option. In some embodiments, the media guidance application may generate a scheduling option for a content item in response to a user request.

When the current time corresponds to a time associated with the selected scheduling option, the media guidance application may perform the corresponding action and display a reminder to the user. For example, as shown, the media guidance application may update the display screen 102b to display screen 102c. As shown, the display screen 102c includes the first content identifier 104 for "Avatar" along with a reminder 114 to consume the content (e.g., "Are you ready to watch Avatar with Sam?"). Although the reminder 114 is shown as being displayed on the same device that the user selected the corresponding scheduling option 108 on (e.g., the tablet), this is only an example, and the reminder 114 may be reproduced on any device associated with the user (e.g., smartphone, voice assistant, computer, TV, etc.). For example, the media guidance application may transmit a text message including the reminder 114 to the user's smartphone.

In some embodiments, if the user does not consume the content item at the scheduled time, the media guidance application may ask the user if they wish to reschedule consumption of the content item (e.g., by identifying a new time and generating a new scheduling option). In some embodiments, the media guidance application may display a prompt for the user to manually enter a new scheduled time, as described in further detail below with respect to FIG. 3.

FIG. 3 shows an example of a display screen 302 that allows a user to specify a time for a scheduling option, in accordance with some embodiments of the present disclosure. As shown, the display screen 302 may include a menu 304 for changing the time associated with the scheduling option 108. For example, the menu 304 may provide the user with an option to specify a desired day and time. In some embodiments, the media guidance application may provide the user with an option to specify a desired day and time for any content items they discover when browsing content items available on the content platform. For example, the media guidance application may provide the user with an option to add a content item to a list (e.g., the hotlist described above). In some embodiments, once a content item has been added to the list, the media guidance application may prevent the content item from being displayed as a recommendation until the time when the content item is scheduled to be consumed. The menu 304 may also provide the user with an option to specify an action associated with the scheduling option. For example, as shown, the user may select "Friday at 3 PM" as the time the user wishes to consume "Avatar," and set "Watch" as an associated option.

Figure 4:
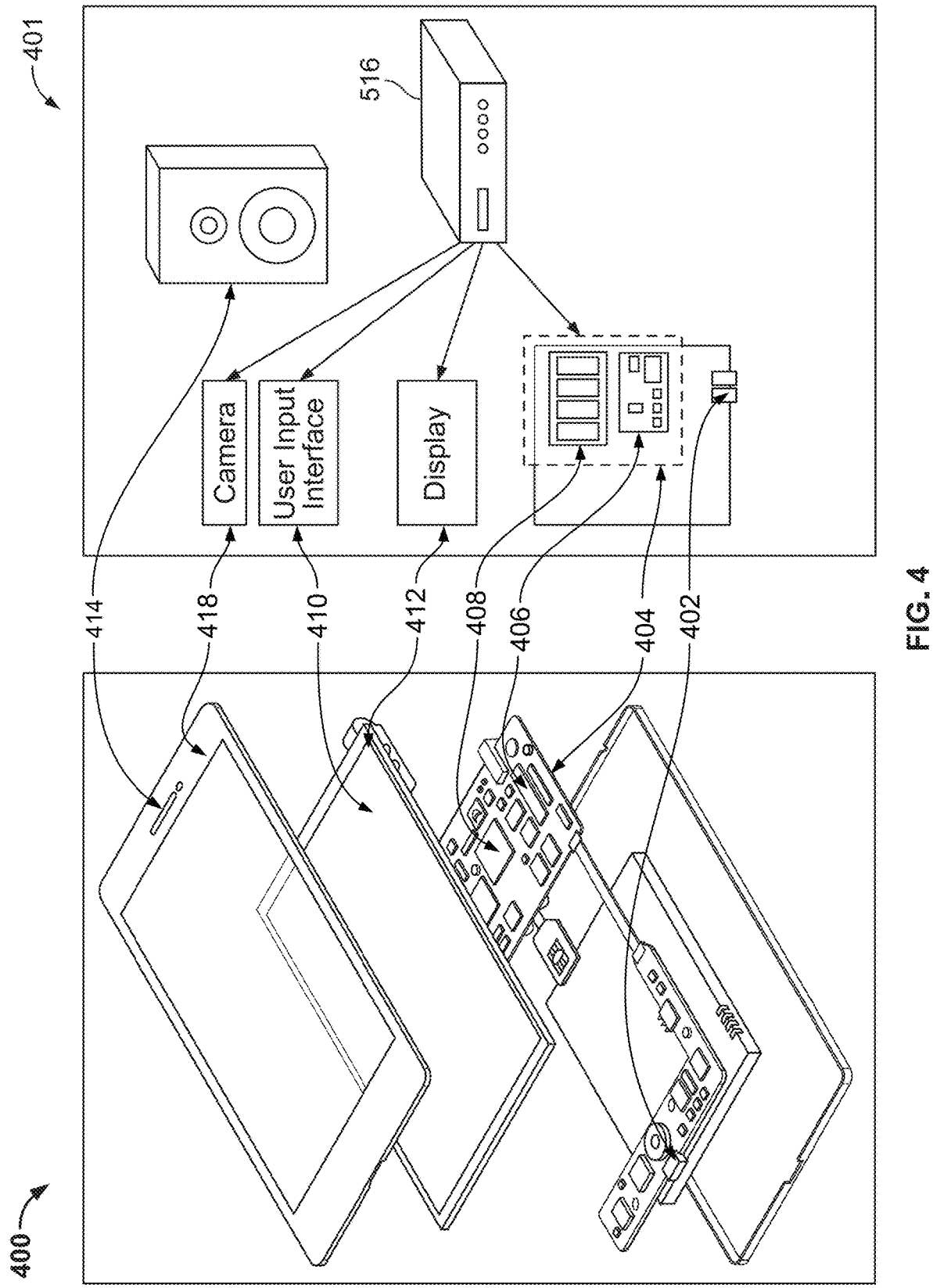
FIGS. 4-5 describe exemplary devices, systems, servers, and related hardware for recommending and dynamically scheduling content, in accordance with some embodiments of the present disclosure.
Figure 5:
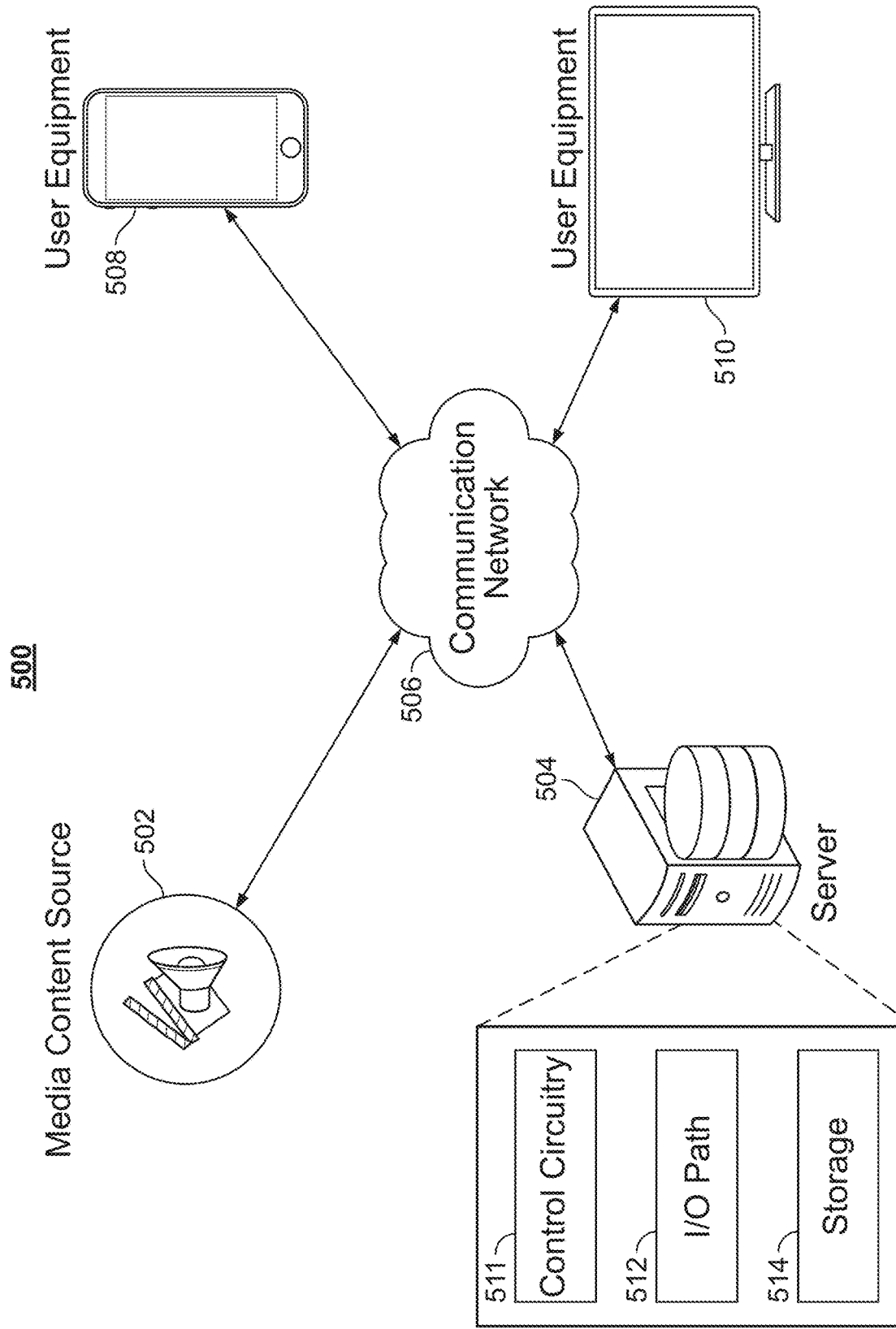

FIGS. 4-5 describe exemplary devices, systems, servers, and related hardware for recommending and dynamically scheduling content, in accordance with some embodiments of the present disclosure. FIG. 4 shows generalized embodiments of illustrative user equipment devices 400 and 401. For example, user equipment device 400 may be a tablet or smartphone device. In another example, user equipment system 401 may be a user television equipment system (e.g., the computing device 101). In another example, the user equipment system 401 may be a stereo or other audio playback device. The user television equipment system 401 may include a set-top box 416. The set-top box 416 may be communicatively connected to a camera 418, a speaker 414, and a display 412. In some embodiments, the camera may detect users viewing the display. In some embodiments, the display 412 may be a television display or a computer display. In some embodiments, the set-top box 416 may be communicatively connected to a user input interface 410. In some embodiments, the user input interface 410 may be a remote control device. The set-top box 416 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 5. Each one of the user equipment device 400 and the user equipment system 401 may receive content and data via input/output (I/O) path 402. The I/O path 402 may provide content (e.g., broadcast programming, on-demand programming, Internet content, content available over a local area network (LAN) or wide area network (WAN), and/or other content) and data to control circuitry 404, which includes processing circuitry 406 and a storage 408. The control circuitry 404 may be used to send and receive commands, requests, and other suitable data using the I/O path 402. The I/O path 402 may connect the control circuitry 404 (and specifically the processing circuitry 406) to one or more communications paths (described below). I/O functions may be provided by one or more of these communications paths, but are shown as a single path in FIG. 4 to avoid overcomplicating the drawing.

The control circuitry 404 may be based on any suitable processing circuitry such as the processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 404 executes instructions for a media guidance application stored in memory (i.e., the storage 408). Specifically, the control circuitry 404 may be instructed by the media guidance application to perform the functions discussed above and below. In some implementations, any action performed by the control circuitry 404 may be based on instructions received from the media guidance application.

In client/server-based embodiments, the control circuitry 404 may include communications circuitry suitable for communicating with a media guidance application server or other networks or servers. The instructions for carrying out the above-mentioned functionality may be stored on a server (which is described in more detail in connection with FIG. 5). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as the storage 408 that is part of the control circuitry 404. As referred to herein, the phrase "electronic storage device" or "storage device" should be understood to mean any device for storing electronic data, computer software, or firmware, such as random-access memory, read-only memory, hard drives, optical drives, digital video recorders (DVRs, sometimes called personal video recorders, or PVRs), solid state devices, quantum storage devices, gaming consoles, gaming media, or any other suitable fixed or removable storage devices, and/or any combination of the same. The storage 408 may be used to store various types of content described herein as well as media guidance application data described above. For example, the storage 408 may be used to store the calendar data described in FIG. 2. In some embodiments, the calendar data may be stored in association with a user profile. Nonvolatile memory may also be used (e.g., to launch a boot-up routine and other instructions). Cloud-based storage, described in relation to FIG. 5, may be used to supplement the storage 408 or instead of the storage 408.

The control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. The control circuitry 404 may also include scaler circuitry for upconverting and downconverting content into the preferred output format of the user equipment 400. The circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If the storage 408 is provided as a separate device from the user equipment device 400, the tuning and encoding circuitry (including multiple tuners) may be associated with the storage 408.

A user may send instructions to the control circuitry 404 using the user input interface 410. The user input interface 410 may be any suitable user interface, such as a remote control, mouse, trackball, keypad, keyboard, touchscreen, touchpad, stylus input, joystick, voice recognition interface, or other user input interfaces. The display 412 may be provided as a stand-alone device or integrated with other elements of each one of the user equipment device 400 and the user equipment system 401. For example, the display 412 may be a touchscreen or touch-sensitive display. In such circumstances, the user input interface 410 may be integrated with or combined with display 412. The display 412 may be one or more of a monitor, a television, a display for a mobile device, or any other type of display. A video card or graphics card may generate the output to the display 412. The video card may be any processing circuitry described above in relation to the control circuitry 404. The video card may be integrated with the control circuitry 404. Speakers 414 may be provided as integrated with other elements of each one of the user equipment device 400 and the user equipment system 401 or may be stand-alone units. The audio component of videos and other content displayed on the display 412 may be played through the speakers 414. In some embodiments, the audio may be distributed to a receiver (not shown), which processes and outputs the audio via speakers 414.

The media guidance application may be implemented using any suitable architecture. For example, it may be a stand-alone application wholly implemented on each one of the user equipment device 400 and the user equipment system 401. In such an approach, instructions of the application are stored locally (e.g., in the storage 408), and data for use by the application is downloaded on a periodic basis (e.g., from an out-of-band feed, from an Internet resource, or using another suitable approach). The control circuitry 404 may retrieve instructions of the application from the storage 408 and process the instructions to rearrange the segments as discussed. Based on the processed instructions, the control circuitry 404 may determine what action to perform when input is received from the user input interface 410. For example, movement of a cursor on a display up/down may be indicated by the processed instructions when the user input interface 410 indicates that an up/down button was selected.

In some embodiments, the media guidance application is a client/server-based application. Data for use by a thick or thin client implemented on each one of the user equipment device 400 and the user equipment system 401 is retrieved on demand by issuing requests to a server remote to each one of the user equipment device 400 and the user equipment system 401. In one example of a client/server-based guidance application, the control circuitry 404 runs a web browser that interprets web pages provided by a remote server. For example, the remote server may store the instructions for the application in a storage device. The remote server may process the stored instructions using circuitry (e.g., the control circuitry 404) and recommend and dynamically schedule content as discussed.

In some embodiments, the media guidance application is downloaded and interpreted or otherwise run by an interpreter or virtual machine (run by the control circuitry 404). In some embodiments, the media guidance application may be encoded in the ETV Binary Interchange Format (EBIF), received by the control circuitry 404 as part of a suitable feed, and interpreted by a user agent running on the control circuitry 404. For example, the media guidance application may be an EBIF application. In some embodiments, the media guidance application may be defined by a series of JAVA-based files that are received and run by a local virtual machine or other suitable middleware executed by control circuitry 404. In some of such embodiments (e.g., those employing MPEG-2 or other digital media encoding schemes), the media guidance application may be, for example, encoded and transmitted in an MPEG-2 object carousel with the MPEG audio and video packets of a program.

FIG. 5 is a diagram of an illustrative media system, in accordance with some embodiments of the disclosure. User equipment devices 508 and 510 (such as the user equipment 101) may be coupled to communication network 506. The communication network 506 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment devices, these devices may communicate directly with each other via communications paths such as short-range communication paths, point-to-point communications paths, such as USB cables, IEEE 1394 cables, wireless paths (e.g., Bluetooth, infrared, IEEE 802-11x, etc.), or other short-range communication via wired or wireless paths. The user equipment devices may also communicate with each other directly through an indirect path via the communication network 506.

The system 500 includes a media content source 502 and a server 504. Communications with the media content source 502 and the server 504 may be exchanged over one or more communications paths but are shown as a single path in FIG. 5 to avoid overcomplicating the drawing. In addition, there may be more than one of each of the media content source 502 and the server 504, but only one of each is shown in FIG. 5 to avoid overcomplicating the drawing. If desired, the media content source 502 and the server 504 may be integrated as one source device.

In some embodiments, the server 504 may include control circuitry 511 and a storage 514 (e.g., RAM, ROM, hard disk, removable disk, etc.). The server 504 may also include an input/output path 512. The I/O path 512 may provide device information, or other data, over a local area network (LAN) or wide area network (WAN), and/or other content and data to the control circuitry 511, which includes processing circuitry, and the storage 514. The control circuitry 511 may be used to send and receive commands, requests, and other suitable data using the I/O path 512. The I/O path 512 may connect the control circuitry 511 (and specifically processing circuitry) to one or more communications paths.

The control circuitry 511 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 511 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 511 executes instructions for an emulation system application stored in memory (e.g., the storage 514). Memory may be an electronic storage device provided as the storage 514 that is part of the control circuitry 511.

The server 504 may retrieve guidance data from media content source 502, process the data as will be described in detail below, and forward the data to the user equipment devices 508 and 510. The media content source 502 may include one or more types of content distribution equipment including an audio distribution facility, a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 502 may be the originator of content (e.g., a television broadcaster, a Webcast provider, etc.) or may not be the originator of content (e.g., an on-demand content provider, an Internet provider of content of broadcast programs for downloading, etc.). The media content source 502 may include cable sources, satellite providers, on-demand providers, Internet providers, over-the-top content providers, or other providers of content. The media content source 502 may also include a remote media server used to store different types of content (including video content selected by a user), in a location remote from any of the client devices.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 504), which may be located centrally or at distributed locations, that provide cloud-based services to various types of users and devices connected via a network (such as the Internet) via communication network 506. In such embodiments, user equipment devices may operate in a peer-to-peer manner without communicating with a central server.

Figure 6:
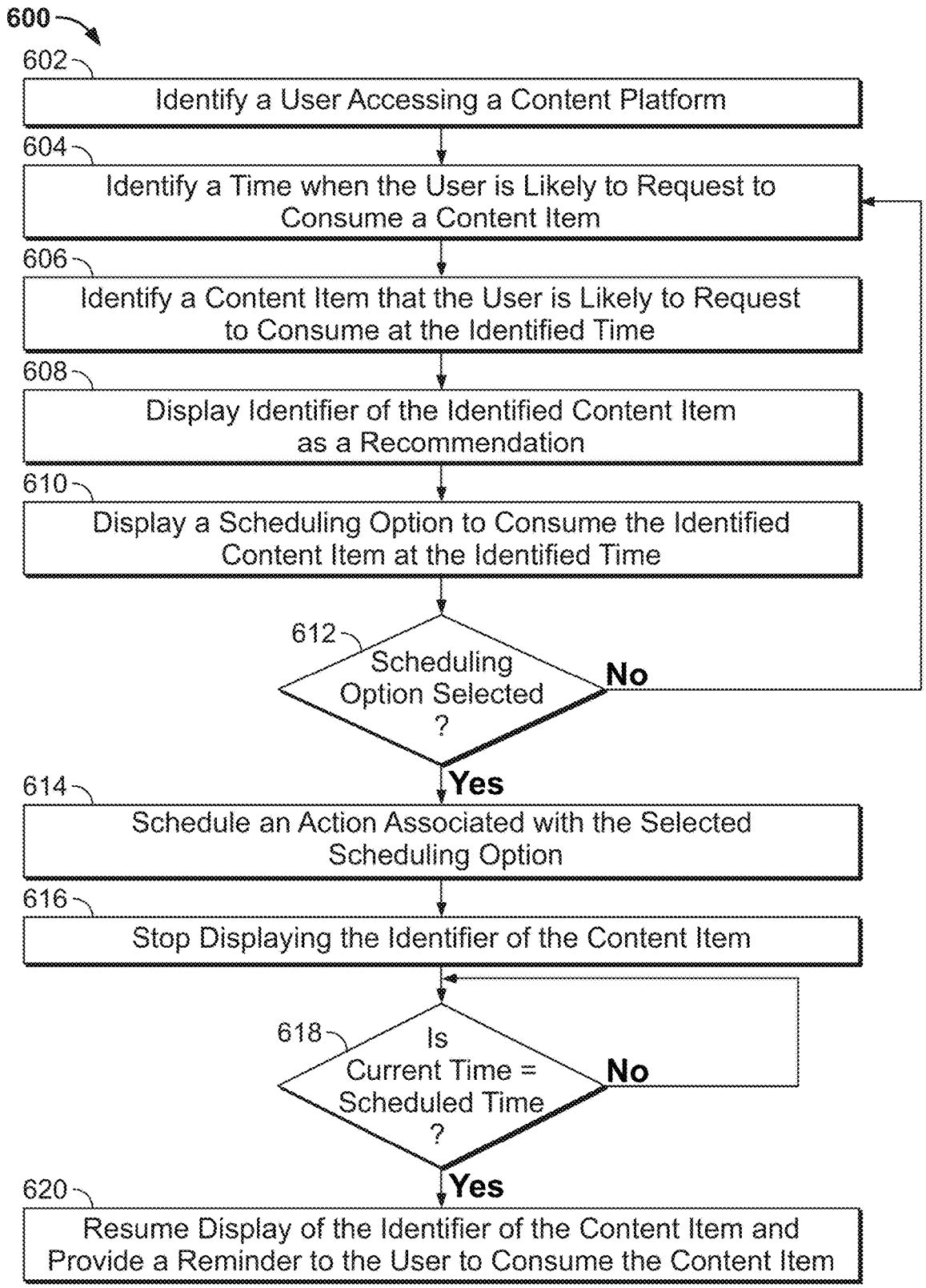
FIG. 6 depicts a flowchart of illustrative steps recommending and dynamically scheduling content, in accordance with some embodiments of the present disclosure.

FIG. 6 depicts a flowchart of illustrative steps for recommending and dynamically scheduling content, in accordance with some embodiments of the present disclosure. The process 600 may be executed by the control circuitry 404 (e.g., in a manner instructed to the control circuitry 404 by the media guidance application). The control circuitry 404 may be part of user equipment (e.g., a device that may have any or all of the functionality of the user equipment devices 508 or 510), or of a remote server separated from the user equipment by way of the communication network 506, or distributed over a combination of both. It should be noted that the process 600, or any step thereof, could be performed on, or provided by, any of the devices shown in FIGS. 1 and 3-5.

The process 600 begins at step 602 when the media guidance application (e.g., via the control circuitry 404) identifies a user accessing a content platform. For example, the control circuitry may identify a user account currently logged in to the content platform. Alternatively, the control circuitry 404 may process signals from the camera 418 to identify a user viewing the display 412 of device accessing the content platform.

At step 604, the media guidance application (e.g., via the control circuitry 404) identifies a time when the user is likely to consume a content item. For example, as described in more detail in connection with FIG. 7, the control circuitry 404 may access a calendar of the user and analyze the calendar to identify the time.

At step 606, the media guidance application (e.g., via the control circuitry 404) identifies a content item that the user is likely to request to consume at the identified time. For example, as described in more detail in connection with FIG. 8, the control circuitry 404 may search the content platform for content items having characteristics matching content preference characteristics associated with the user.

At step 608, the media guidance application (e.g., via the control circuitry 404) displays an identifier of the identified content item as a recommendation. For example, the control circuitry 404 may cause a thumbnail image associated with the content item, a title, brief description, or other identifying information of the content item to be displayed to a user.

At step 610, the media guidance application (e.g., via the control circuitry 404) displays a scheduling option to consume the identified content item at the identified time. For example, as described in more detail in connection with FIG. 9, the control circuitry 404 may overlay the scheduling option on the displayed identifier of the content item.

At step 612, the media guidance application (e.g., via the control circuitry 404) determines if the scheduling option is selected by the user. If the control circuitry determines that the scheduling option has not been selected ("No" at 612), the process 600 may return back to 604 to update the recommendations provided to the user. Otherwise, if the control circuitry 404 determines that the scheduling option has been selected ("Yes" at 612), the process 600 may proceed to step 614.

At step 614, the media guidance application (e.g., via the control circuitry 404) schedules an action associated with the scheduling option. For example, if the scheduling option is to record the content item to consume at the identified time (e.g., while the user is on a flight and does not have access to the content platform), the control circuitry 404 schedules download of the content item before the identified time. Otherwise, if the scheduling option is simply to consume the content item at the identified time, the control circuitry schedules a reminder to provide to the user at the identified time.

At step 616, the media guidance application (e.g., via the control circuitry 404) stops displaying the identifier of the content item. For example, because the user has scheduled a time to consume the content item, the control circuitry 404 may cause the identifier of the content item to stop being displayed as a recommendation to the user.

At step 618, the media guidance application (e.g., via the control circuitry 404) determines if the current time is equal to the scheduled time. If the control circuitry 404 determines that the current time is not equal to the scheduled time ("No" at 618), the process 600 may remain at 618 until the current time is equal to the scheduled time. Once the control circuitry 404 determines that the current time is equal to the scheduled time ("Yes" at 618), the process 600 may proceed to 620.

At step 620, the media guidance application (e.g., via the control circuitry 404) resumes displaying the identifier of the content item and provides a reminder to the user to consume the content item. For example, as described in more detail in correction with FIG. 10, the control circuitry may send a reminder to a user device (e.g., a smartphone of the user) different from the user device the user selected the scheduling option on.

Figure 7:
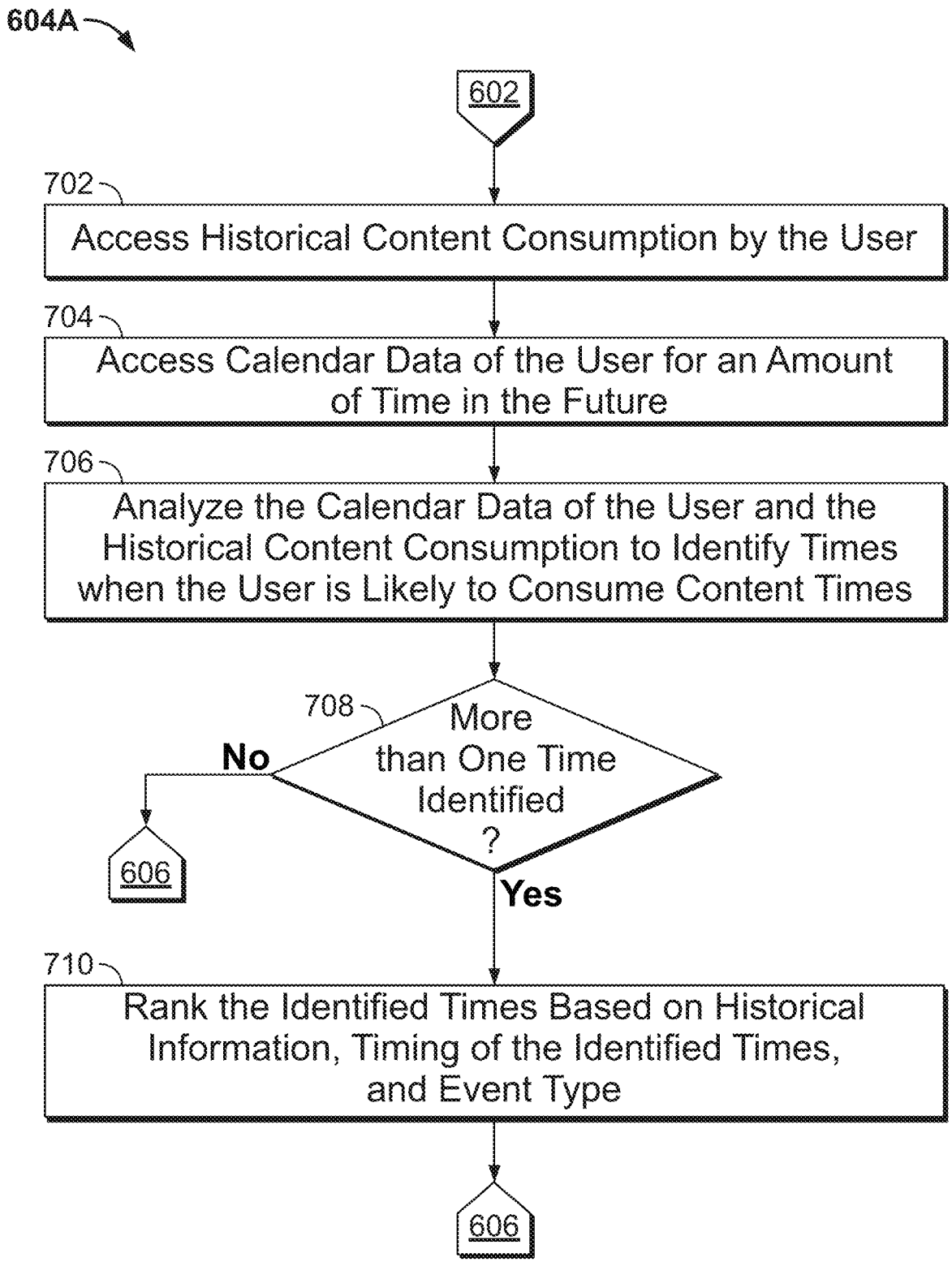
FIG. 7 depicts a flowchart of illustrative steps for identifying a time when the user is likely to request to consume a content item, in accordance with some embodiments of the present disclosure.

FIG. 7 depicts a flowchart of illustrative steps for identifying a time when the user is likely to request to consume a content item, in accordance with some embodiments of the present disclosure. Process 604A is one embodiment of a method for performing step 604 of FIG. 6 and begins after step 602. At step 702, the media guidance application (e.g., via the control circuitry 404) accesses historical content consumption of the user. The historical content consumption may include a viewing history of the user, including the dates and times when the user has consumed those content items.

At step 704, the media guidance application (e.g., via the control circuitry 404) accesses calendar data of the user for an amount of time in the future. For example, the control circuitry 404 accesses the next week of the calendar of the user.

At step 706, the media guidance application (e.g., via the control circuitry 404) analyzes the calendar data of the user and the historical content consumption to identify times when the user is likely to consume content items. For example, the control circuitry 404 may identify events (e.g., taking a flight, having a friend over) where the user is likely to request to consume content. The control circuitry may compare these identified events to a user's historical content consumption during similar events.

At step 708, the media guidance application (e.g., via the control circuitry 404) determines if more than one time has been identified. If the control circuitry 404 determines that more than one time has not been identified ("No" at 708), the control circuitry 404 identifies the time as the time when the user is likely to consume the content item, and the process 604A then continues with step 606 in FIG. 6. If the control circuitry determines that more than one time has been identified ("Yes" at 708), the process 604A may proceed to step 710.

At step 710, the media guidance application (e.g., via the control circuitry 404) ranks the identified times based on historical information, timing of the identified times (e.g., how far in the future the identified time is), and an event type associated with the identified time. For example, the control circuitry 404 may determine, among the identified times, when the user is most likely to request a content item. For example, if one of the identified times corresponds to a flight and the control circuitry 404 determines that the user always downloads content to watch on flights, the control circuitry 404 may rank the identified time higher than other identified times. The process then continues with step 606 in FIG. 6.

Figure 8:
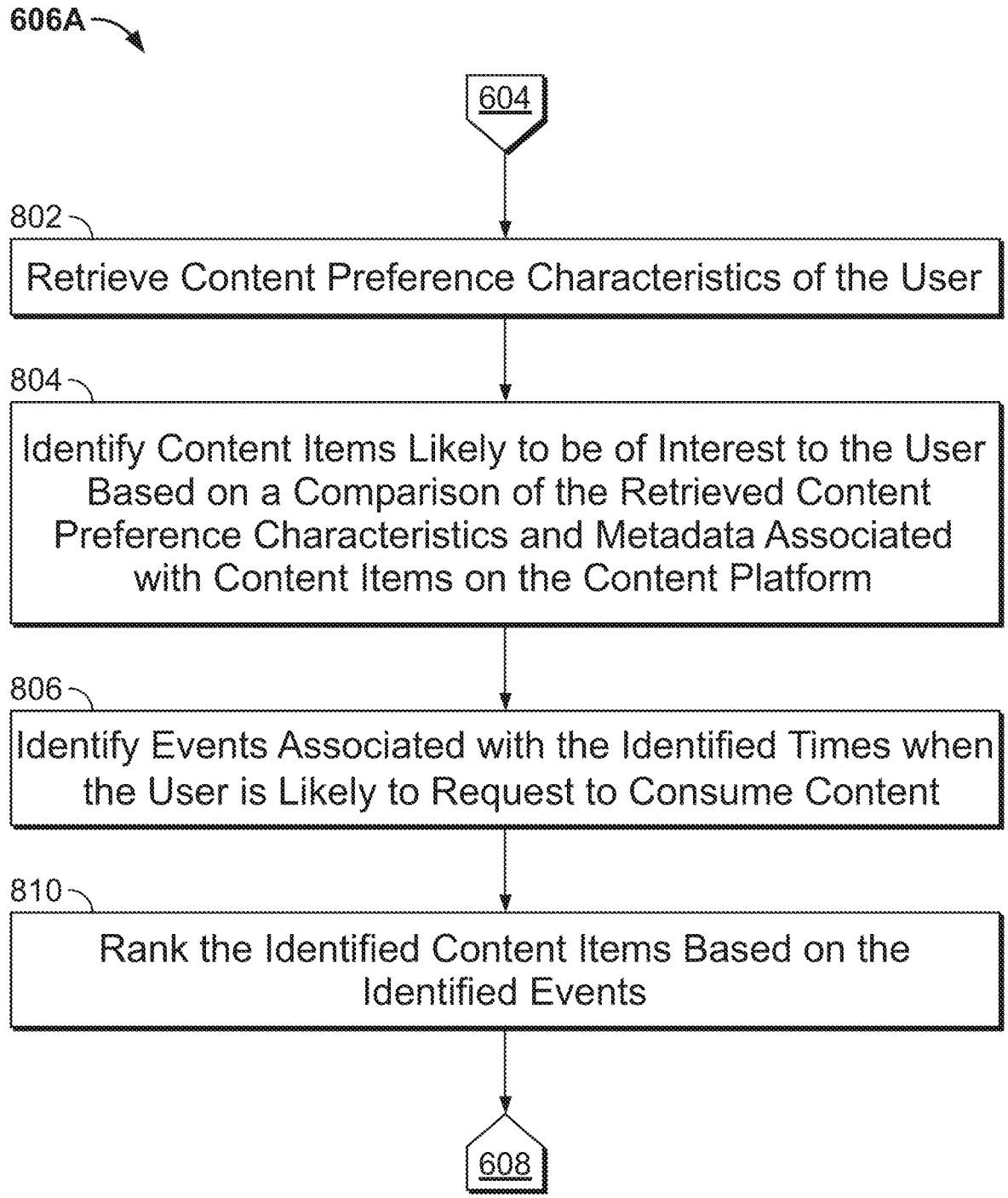
FIG. 8 depicts a flowchart of illustrative steps for identifying a content item that the user is likely to request to consume at the identified time, in accordance with some embodiments of the present disclosure.

FIG. 8 depicts a flowchart of illustrative steps for identifying a content item that the user is likely to request to consume at the identified time, in accordance with some embodiments of the present disclosure. Process 606A is one embodiment of a method for performing step 606 of FIG. 6 and begins after step 604. At step 802, the media guidance application (e.g., via the control circuitry 404), retrieves content preference characteristics of the user.

At step 804, the media guidance application (e.g., via the control circuitry 404) identifies content items likely to be of interest to the user based on a comparison of the retrieved content preference characteristics and metadata associated with the content items on the content platform.

At step 806, the media guidance application (e.g., via the control circuitry 404) identifies events associated with the identified times when the user is likely to request to consume content items. For example, the control circuitry 404 may identify that the event is a flight.

At step 808, the media guidance application (e.g., via the control circuitry 404) ranks the identified content items based on the identified events. For example, if the identified event is in a public place (e.g., on an airplane), the control circuitry 404 may prioritize content items that have lower ratings (e.g., G, PG, PG-13). The process then continues with step 608 in FIG. 6.

Figure 9:
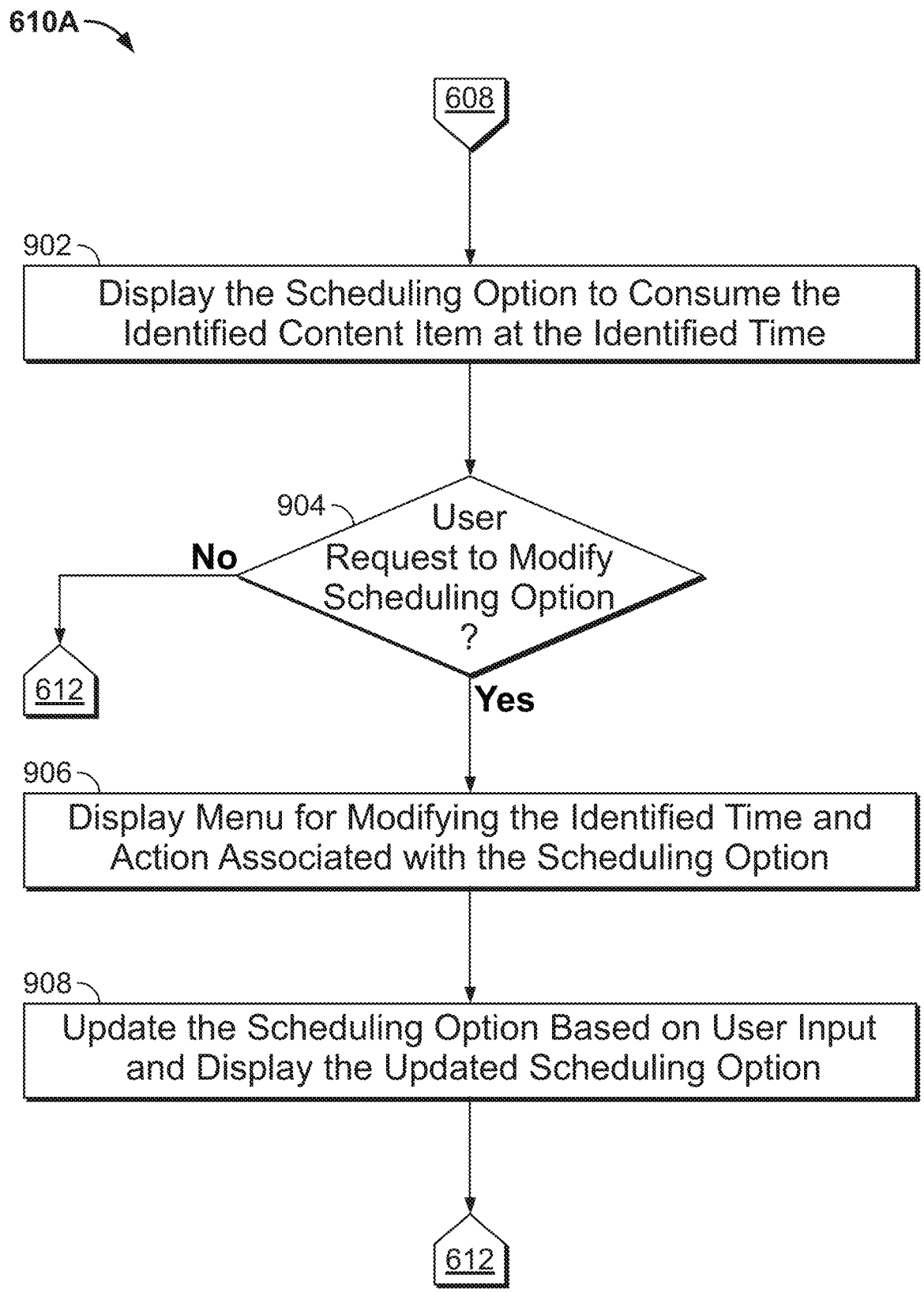
FIG. 9 depicts a flowchart of illustrative steps for displaying a scheduling option to consume the identified content item at the identified time, in accordance with some embodiments of the present disclosure.

FIG. 9 depicts a flowchart of illustrative steps for displaying a scheduling option to consume the identified content item at the identified time, in accordance with some embodiments of the present disclosure. Process 610A is one embodiment of a method for performing step 610 of FIG. 6 and begins after step 608. At step 902, the control circuitry 404 displays the scheduling option to consume the identified content item at the identified time.

At step 904, the media guidance application (e.g., via the control circuitry 404) determines if the user has requested to modify the displayed scheduling option. If the control circuitry 404 determines that the user has not requested to modify the displayed scheduling option ("No" at 904), the process may proceed to 612 in FIG. 6. Otherwise, if the control circuitry 404 determines that the user has requested to modify the displayed scheduling option ("Yes" at 904), the process may proceed to 906.

At step 906, the media guidance application (e.g., via the control circuitry 404) displays a menu for modifying the scheduling option. For example, the menu may include an option to modify both the identified time and an action associated with the scheduling option (e.g., watch or record).

At step 908, the media guidance application (e.g., via the control circuitry 404) updates the scheduling options with the user's changes and displays the updated scheduling option. The process then continues with step 608 in FIG. 6.

Figure 10:
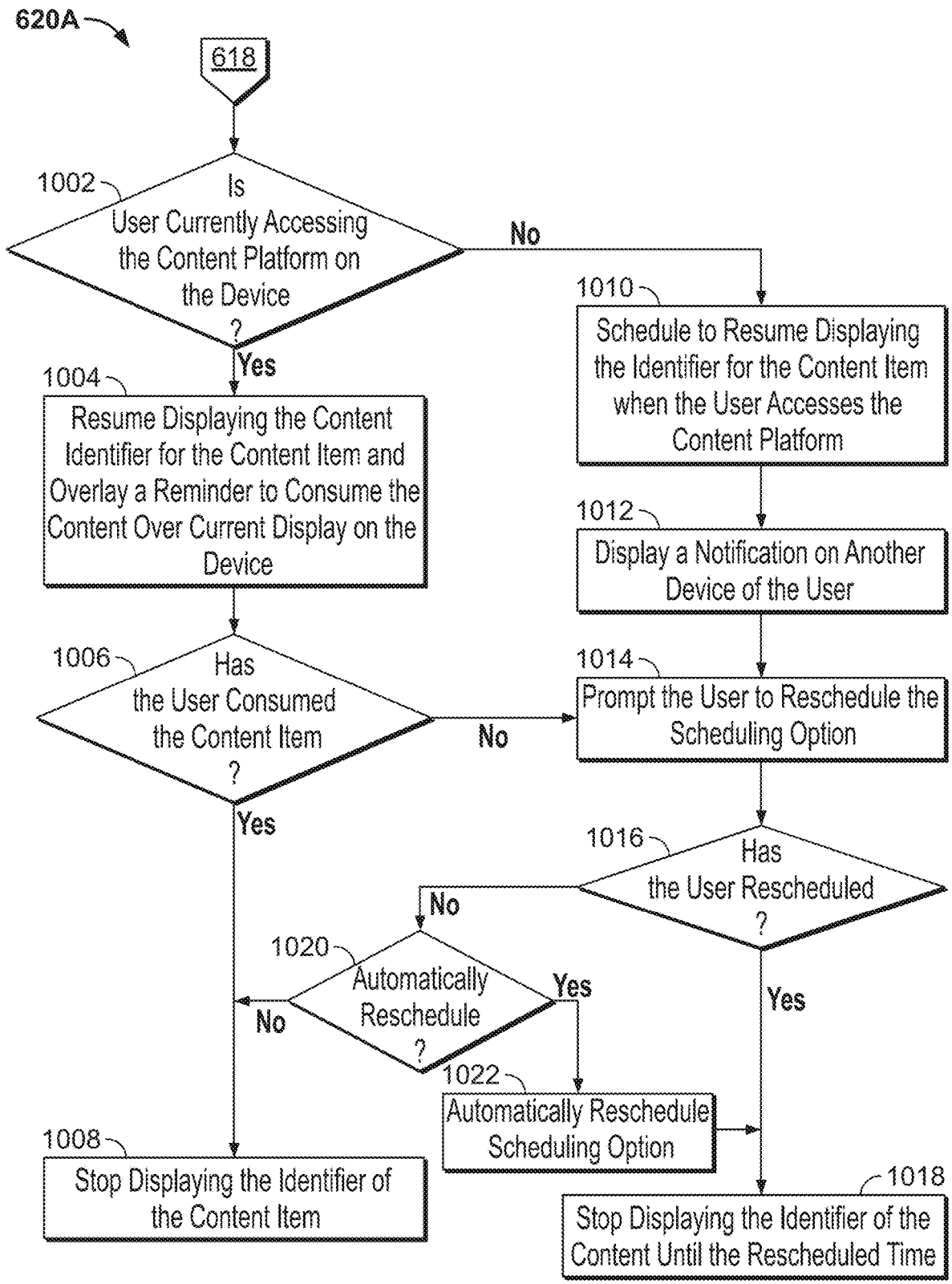
FIG. 10 depicts a flowchart of illustrative steps for resuming display of the identifier of the content item and providing a reminder to the user to consume the content item, in accordance with some embodiments of the present disclosure.

FIG. 10 depicts a flowchart of illustrative steps for resuming display of the identifier of the content item and providing a reminder to the user to consume the content item, in accordance with some embodiments of the present disclosure. Process 620A is one embodiment of a method for performing step 620 of FIG. 6 and begins after step 618. At step 1002, the media guidance application (e.g., via the control circuitry 404), determines if the user is currently accessing the content platform (e.g., at the scheduled time of the scheduling option) on the device they will likely consume the content item on. If the control circuitry determines that the user is not currently accessing the content platform on the device ("No" at 1002), the process may proceed to step 1010. Otherwise ("Yes" at 1002), the process may proceed to 1004.

At step 1004, the media guidance application (e.g., via the control circuitry 404) resumes displaying the content identifier for the content item (e.g., as a recommendation or as part of a reminder) and overlays a reminder to consume the content over the current display on the device.

At step 1006, the media guidance application (e.g., via the control circuitry 404) determines if the user has consumed the content item. For example, the control circuitry 404 may wait for a predetermined time (e.g., an hour, the next day, etc.) to allow the user time to consume the content item. If the control circuitry 404 determines that the user has consumed the content item ("Yes" at 1006), the process may proceed to step 1008. Otherwise ("No" at 1006), the process may proceed to 1014.

At step 1008, the media guidance application (e.g., via the control circuitry 404) stops displaying the identifier of the content item. For example, the control circuitry 404 may stop recommending the content item to the user. The control circuitry may also cancel a reminder to consume the content item.

At step 1010, the media guidance application (e.g., via the control circuitry 404) may schedule to resume displaying the identifier for the content item when the user accesses the content platform.

At step 1012, the media guidance application (e.g., via the control circuitry 404) displays a notification on another device of the user. For example, the control circuitry 404 may transmit a reminder to a device that the user is likely to frequently check (e.g., a smartphone)

At step 1014, the media guidance application (e.g., via the control circuitry 404) prompts the user to reschedule the scheduling option. For example, the control circuitry 404 may ask the user if they would like to reschedule the scheduling option for the next identified time in the calendar of the user. In some embodiments, step 1014 may be omitted (e.g., if the user has not rescheduled the scheduling option in the past) and the control circuitry 404 may automatically reschedule the scheduling option to the next identified time in the calendar of the user (e.g., step 1020)

At step 1016, the media guidance application (e.g., via the control circuitry 404) determines if the user has rescheduled the scheduling option. For example, the control circuitry 404 may wait for a predetermined time (e.g., a few minutes, an hour) to allow the user time to reschedule the scheduling option. If the control circuitry 404 determines that the user has rescheduled the scheduling option ("Yes" at 1016), the process may proceed to step 1018. Otherwise ("No" at 1016), the process may proceed to 1020.

At step 1018, the media guidance application (e.g., via the control circuitry 404) stops displaying the identifier of the content until the rescheduled time.

At step 1020, the media guidance application (e.g., via the control circuitry 404) determines whether to automatically reschedule the scheduling option. For example, the control circuitry 404 may determine if the user is still interested in consuming the content item. In some embodiments, the control circuitry 404 may determine that the user is still interested in the content item if the user has not rescheduled the scheduling option in the past. If the control circuitry 404 determines to not automatically reschedule the scheduling option ("No" at 1020), the process may proceed to 1008. Otherwise ("Yes" at 1020), the process may proceed to 1022.

At step 1022, the media guidance application (e.g., via the control circuitry 404) automatically reschedules the scheduling option. For example, the control circuitry 404 may automatically reschedule the scheduling option for the next identified time when user is likely to request to consume the content.

Figure 11:
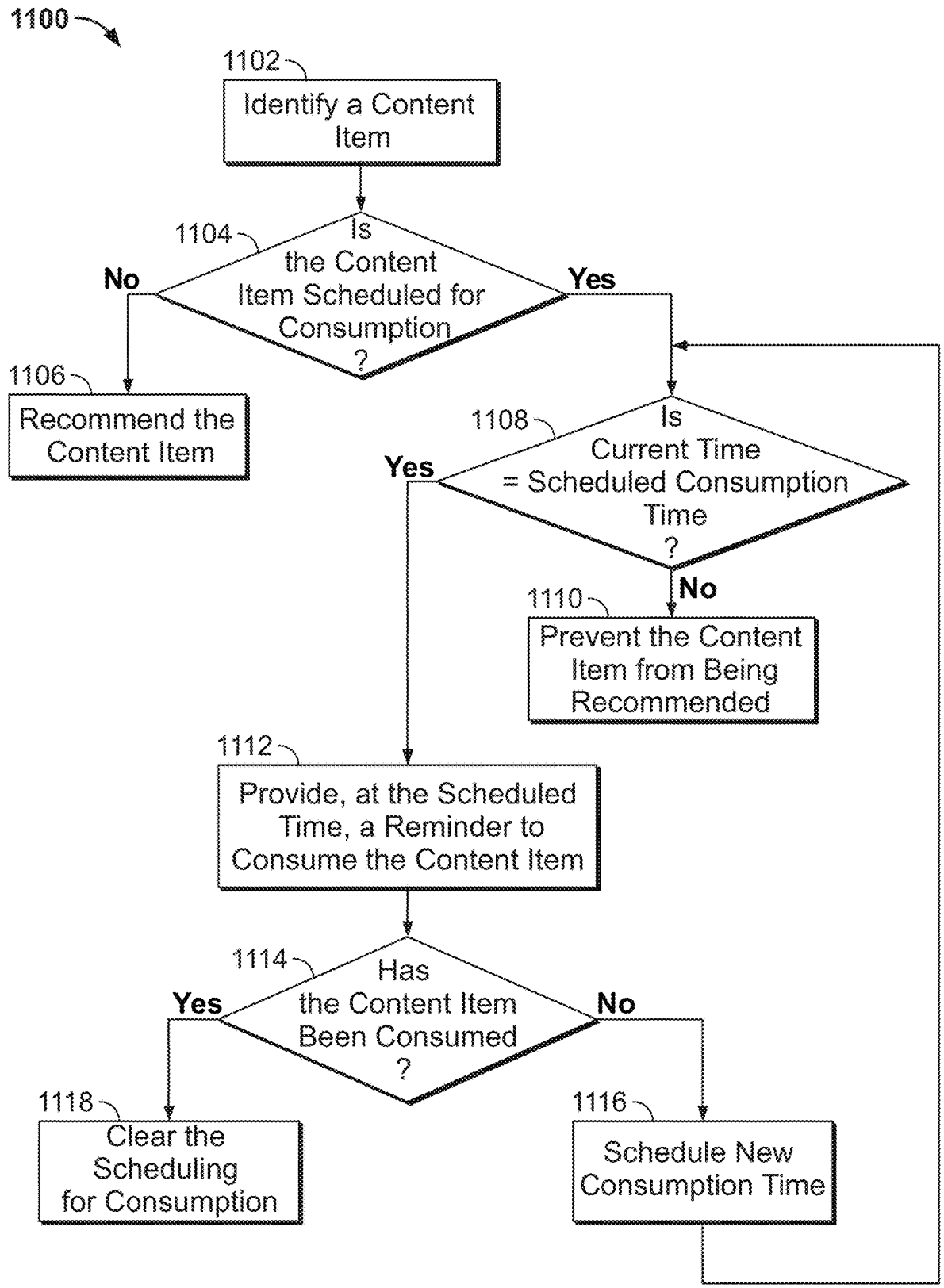
FIG. 11 depicts a flowchart of illustrative steps for managing recommendations of content, in accordance with some embodiments of the present disclosure.

FIG. 11 depicts a flowchart of illustrative steps for managing recommendations of content, in accordance with some embodiments of the present disclosure. The process 1100 may be executed by the control circuitry 404 (e.g., in a manner instructed to the control circuitry 404 by the media guidance application). The process 1100 begins at step 1102 when the media guidance application (e.g., via the control circuitry 404), identifies a content item. For example, the control circuitry may identify a content item to recommend to a user (e.g., as described above with reference to FIG. 8).

At step 1104, the media guidance application (e.g., via the control circuitry 404) determines if the content item is scheduled for consumption. In some embodiments, content items that have been scheduled for consumption may be stored in a hotlist, and the control circuitry 404 may determine if the content item is included in the hotlist. If the control circuitry 404 determines that the content item is scheduled for consumption ("Yes" at 1104), the process may proceed to 1106. Otherwise ("No" at 1104), the process may proceed to 1108.

At step 1106, the media guidance application (e.g., via the control circuitry 404) recommends the content item. For example, the control circuitry 404 may cause an identifier of the content item to be displayed as a recommendation to a user. For example, the identifier of the content item may be included in a "Recommended for you" section for the user.

At step 1108, the media guidance application (e.g., via the control circuitry 404) determines if the current time is equal to the scheduled consumption time for the content item. If the control circuitry 404 determines that the current time is not equal to the scheduled consumption time ("No" at 1108), the process may proceed to 1110. Otherwise ("Yes" at 1108), the process may proceed to 1112.

At step 1110, the media guidance application (e.g., via the control circuitry 404) prevents the content item from being recommended to the user. For example, the control circuitry 404 prevents an identifier of the content item from being included in the "Recommended for you" section for the user.

At step 1112, the media guidance application (e.g., via the control circuitry 404) provides, at the scheduled time, a reminder to the user to consume the content item. For example, the control circuitry 404 may cause the reminder to be displayed on the device the user used to schedule the content item, or may transmit the reminder to another device associated with the user (e.g., a smartphone of the user).

At step 1114, the media guidance application (e.g., via the control circuitry 404) determines if the content item has been consumed. For example, a predetermined time after the scheduled time (e.g., accounting for the length of the content item), the control circuitry 404 may check to see if the content item has been consumed (or if the user is currently consuming the content item). If the control circuitry 404 determines that the content item has not been consumed ("No" at 1114), the process may proceed to 1116. Otherwise ("Yes" at 1114), the process may proceed to 1118.

At step 1116, the media guidance application (e.g., via the control circuitry 404) schedules a new consumption time for the content item. For example, the control circuitry 404 may schedule a new consumption time as described above in FIG. 10.

At step 1118, the media guidance application (e.g., via the control circuitry 404) clears the scheduling for consumption for the content item. For example, the control circuitry 404 may remove the content item from the hotlist. In some embodiments, the control circuitry 404 may prevent the content item from being recommended to the user again.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   identifying, based on a scheduled future event identified in a user profile, a time when a request to consume a content item is likely to be received;
   prior to the identified time, generating, for a device associated with the user profile, a display of an identifier of the content item and an option to consume, at the identified time, the content item;
   receiving a selection of the option to consume;
   in response to the receiving of the option to consume, causing the device to stop displaying the identifier of the content item until the identified time; and
   causing the device to display the content item at the identified time.

2. The method of claim 1, wherein the identifying of the time when the request to consume the content item is likely to be received comprises:
   determining, based on historical data in the user profile, that a user associated with the user profile is likely to be interested in the content item.

3. The method of claim 1, wherein the scheduled future event corresponds to a time when a user associated with the user profile is in transit.

4. The method of claim 1, wherein the scheduled future event is a scheduled flight of a user associated with the user profile.

5. The method of claim 1, further comprising:
   at the identified time, causing the device to resume displaying of the identifier of the content item.

6. The method of claim 1, wherein the device is a first device, and wherein the method further comprises:
   at the identified time, transmitting, to a second device, a reminder to consume the content item.

7. The method of claim 1, wherein the display of the identifier of the content item and the option to consume comprises an indication that the content item is available to be consumed at the identified time.

8. The method of claim 7, wherein the display of the identifier of the content item and the option to consume comprises an indication that the content item is available to be consumed at the identified time and identifies the scheduled future event.

9. The method of claim 1, wherein the method further comprises:
   determining that the content item was not consumed at the identified time;
   in response to the determining that the content item was not consumed at the identified time, generating for display at the device a display of the identifier of the content item and a second option to consume, at a modified time, the content item,
   wherein the second option to consume the content item is displayed simultaneously with the identifier of the content item and indicates that the content item is available to be consumed at the identified time and identifies the scheduled future event;
   receiving a selection of the second option to consume; and
   in response to the receiving of the selection of the second option, causing the device to stop displaying the identifier of the content item until the modified time.

10. The method of claim 9, wherein the modified time is identified based on a second scheduled future event identified in the user profile.

11. A system comprising:
processing circuitry configured:
- to identify, based on a scheduled future event identified in a user profile, a time when a request to consume a content item is likely to be received; and
- prior to the identified time, to generate, for a device associated with the user profile, a display of an identifier of the content item and an option to consume, at the identified time, the content item;

communication circuitry configured to receive a selection of the option to consume; and the processing circuitry further configured:
- in response to the receiving of the option to consume, to cause the device to stop displaying the identifier of the content item until the identified time; and
- to cause the device to display the content item at the identified time.

12. The system of claim 11, wherein the identifying of the time when the request to consume the content item is likely to be received comprises:
determining, based on historical data in the user profile, that a user associated with the user profile is likely to be interested in the content item.

13. The system of claim 11, wherein the scheduled future event corresponds to a time when a user associated with the user profile is in transit.

14. The system of claim 11, wherein the scheduled future event is a scheduled flight of a user associated with the user profile.

15. The system of claim 11, wherein the processing circuitry is further configured, at the identified time, to cause the device to resume displaying of the identifier of the content item.

16. The system of claim 11, wherein the device is a first device, and the processing circuitry is further configured, at the identified time, to transmit, to a second device, a reminder to consume the content item.

17. The system of claim 11, wherein the display of the identifier of the content item and the option to consume comprises an indication that the content item is available to be consumed at the identified time.

18. The system of claim 17, wherein the display of the identifier of the content item and the option to consume comprises an indication that the content item is available to be consumed at the identified time and identifies the scheduled future event.

19. The system of claim 11, wherein the processing circuitry is further configured:
- to determine that the content item was not consumed at the identified time;
- in response to the determining that the content item was not consumed at the identified time, to generate for display at the device a display of the identifier of the content item and a second option to consume, at a modified time, the content item,
- wherein the second option to consume the content item is displayed simultaneously with the identifier of the content item and indicates that the content item is available to be consumed at the identified time and identifies the scheduled future event;
- to receive a selection of the second option to consume; and
- in response to the receiving of the selection of the second option, to cause the device to stop displaying the identifier of the content item until the modified time.

20. The system of claim 19, wherein the modified time is identified based on a second scheduled future event identified in the user profile.

* * * * *